Nov. 26, 1963  W. A. BARTEL  3,112,124
DOUBLE IMPLEMENT DRAWBAR
Filed March 22, 1962  2 Sheets-Sheet 1

Walter A. Bartel
INVENTOR.

BY *Clarence A. O'Brien*
*and Harvey B. Jacobson*
Attorneys

Nov. 26, 1963 W. A. BARTEL 3,112,124
DOUBLE IMPLEMENT DRAWBAR
Filed March 22, 1962 2 Sheets-Sheet 2
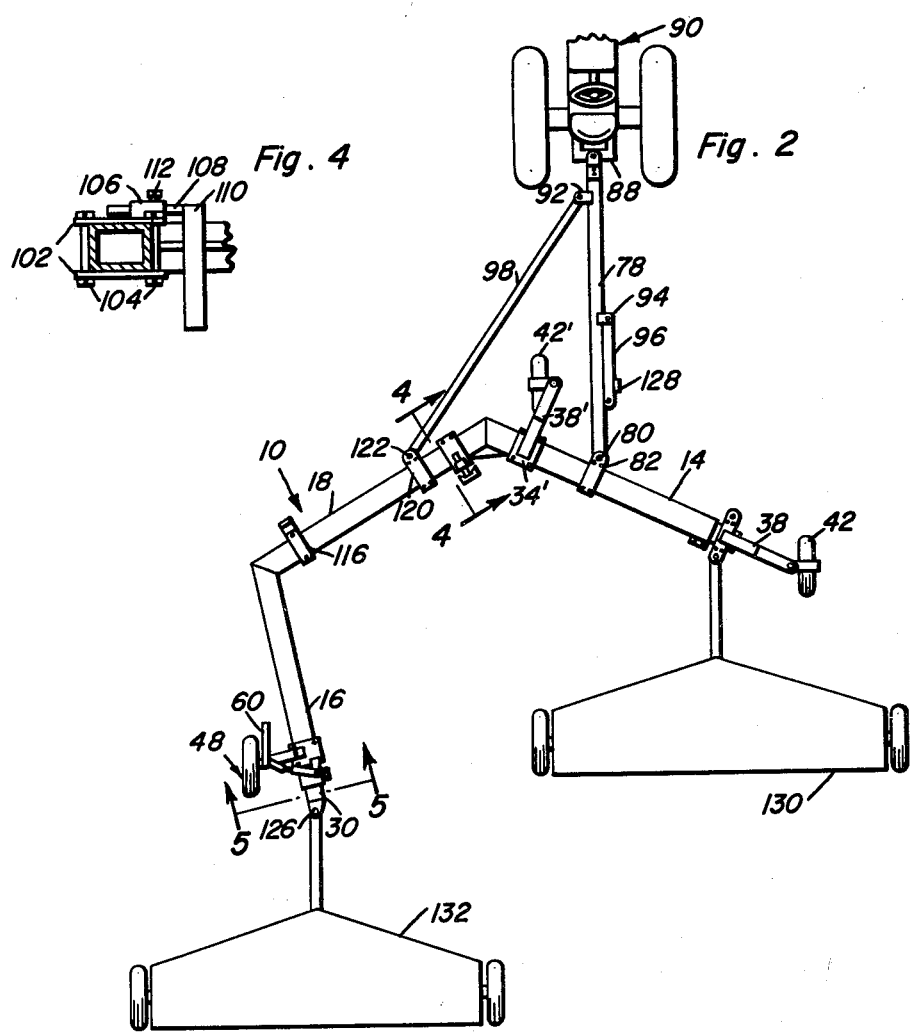
Walter A. Bartel
INVENTOR.

United States Patent Office 3,112,124
Patented Nov. 26, 1963

3,112,124
DOUBLE IMPLEMENT DRAWBAR
Walter A. Bartel, Fairview, Okla.
Filed Mar. 22, 1962, Ser. No. 181,663
6 Claims. (Cl. 280—412)

This invention relates to towing devices, and more particularly to a drawbar for towing a pair of farm implements either in tandem or side-by-side arrangement.

This invention is an improvement over my prior Patent No. 2,971,774, filed January 6, 1960.

In many farm operations, it is desirable to tow a plurality of implements across a field so that a maximum width of the field will be cultivated, drilled or otherwise conditioned by a single pass of the tractor. In order to accomplish this, it is necessary to orientate the implements so that their paths of travel are disposed in side-by-side relation. However, such implements are quite often pulled to the field over a road surface and through a gate opening. When this is done, the implements cannot be disposed with their paths of movement side-by-side since their width precludes this. Rather, it is necessary that the implements be disposed in tandem relationship or one behind the other when being towed over the road. In order to accomplish this, it is usually necessary to unhook both of the implements from the drawbar and completely re-orientate them in relation to each other and in relation to the tractor drawbar. This is not only time-consuming, but also requires considerable effort due to the usual weight and bulkiness of such implements and sometimes may result in injury due to the heaviness of the implements involved.

Therefore, it is the primary object of the present invention to provide a novel double implement drawbar incorporating a structural arrangement which will effectively pull a pair of implements such as grain drills behind a tractor so that their paths of movement are side-by-side and subsequently being easily converted to an over-the-road condition so that the implements are disposed in tandem relationship without unhitching the implements from the drawbar assembly and without disconnecting the tractor from the drawbar assembly with it only being necessary to disconnect one link, connect another link and adjust a single supporting wheel.

Another object of the present invention is to provide a drawbar in accordance with the preceding object which is extremely simple in construction, easily converted from a field setting to an over-the-road setting, economical to manufacture, rugged in structure, durable in use and well adapted for its particular purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a plan view similar to FIGURE 1 but showing the drawbar re-arranged so as to tow the grain drills in side-by-side relationship;

FIGURE 3 is a side elevational view of the tow bar as shown in FIGURE 2 with the tractor and grain drills removed;

FIGURE 4 is an enlarged vertical cross-sectional view taken substantially on the plane of line 4—4 of FIGURE 2;

FIGURE 5 is an enlarged vertical cross-sectional view taken substantially on the plane of line 4—4 in FIGURE 2.

Figure 1:
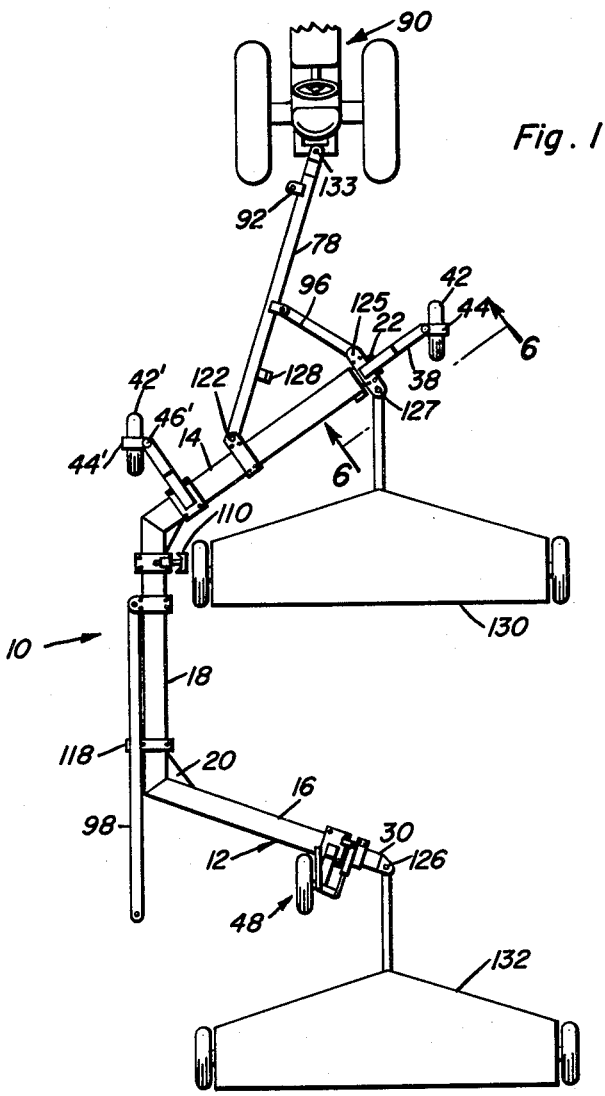
FIGURE 1 is a plan view of the drawbar connected to a towing tractor and a pair of grain drills in tandem relationship.

Referring to the drawings, it can be seen that the double implement drawbar 10 includes a generally U-shaped frame 12 comprising a front leg 14, a rear leg 16 and a bight portion 18 connecting an end of each leg. As shown in FIGURE 1, the legs slope so as to converge towards one another at the left side of the frame. Both legs form obtuse angles with the bight portion 18, however, the leg 14 forms a greater angle with the bight portion than does the rear leg 16. However, since the front leg is considerably longer than the rear leg a line between the free ends of each leg will be parallel with the bight portion 18.

Frame 12 is preferably hollow and rectangular in cross section. Triangular bracing plates 20 are provided between the connections of the legs to the bight portion 18. The free end of the front leg 14 slidably and telescopically receives an elongated extension member 22 which is also preferably hollow and rectangular in cross section. In a similar manner, the free end of the rear leg 16 slidably receives a similar extension member 30.

Figure 6:
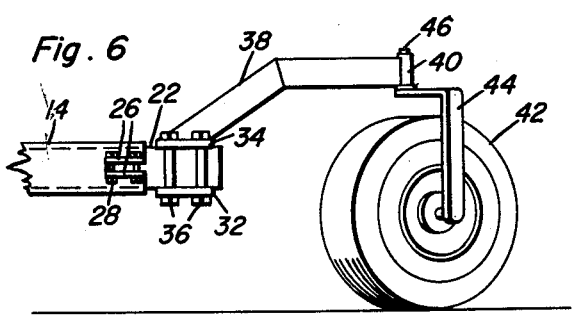
FIGURE 6 is an enlarged vertical cross-sectional view taken substantially on the plane of line 6—6 in FIGURE 1.

As shown in FIGURE 6, one side wall at the forward end of front leg 14 is provided with a horizontal slot which terminates in horizontally projecting parallel flanges 26 having aligned apertures therethrough which receive nut and bolt assemblies 28. This permits the longitudinal position of the extension 22 to be slidably adjusted in relation to the leg 14 and then the extension and leg are secured together by tightening the nut and bolt assemblies 28 so as to securely clamp the extension 22 within leg 14. In a similar manner, the rear end of rear leg 16 has a slot in its side wall terminating in flanges 26 which have aligned bores therein also receiving nut and bolt assemblies 28. A slidable extension 30 is received in the rear end of leg 16 and clamped therein by nut assemblies 28 and flanges 26.

Opposed flat clamping plates 32 and 34 are located on the lower and upper surfaces of extension member 22 and clamped thereto by nut and bolt assemblies 36 which extend through aligned apertures in the plates. An angular arm 38 is secured to the upper surface of plate 34 and extends upwardly and forwardly therefrom. The upper end of the arm 38 is substantially horizontal and is connected to a journal sleeve 40 which rotatably supports a conventional caster wheel assembly comprising a wheel 42 rotatably mounted on an axle which is secured at one end to an L-shaped axle support 44 having an upper horizontal leg whose free end is connected to a pivot pin 46 which is journalled in the sleeve 40.

A substantially identical caster wheel assembly is also secured to the opposite end of front leg 14 and includes a wheel 42' journalled on an axle support 44'. The upper end of the axle support 44' is provided with a substantially vertical pivot pin 46' which is journalled in the free end of a cantilevered angular arm 38'. The rear end of arm 38' is secured to a plate 34' which is secured to the leg 14 by a lower plate and nut and bolt assemblies in the same manner as arm 38 shown in FIGURE 6.

An adjustable rear wheel assembly 48 is swivelly connected to the rear of the arm 16. The assembly 48 includes a cantilevered angular arm 50 having one end secured to the upper surface of a plate 52 on top of the rear end of arm 16. A plate 54 is directly below the plate 52 and the plates are adjustably clamped to the upper and lower surfaces of the arm 16 by means of nut and bolt assemblies 56. The rear wheel 58 is rotatably mounted on the horizontal component of an L-shaped axle 59 which has a vertical component journalled in the free end of arm 50. The upper end of the axle 59 extends through and beyond arm 50 and is connected to a tubular L-shaped handle assembly 60. The handle is adjustably secured to the axle 59 by means of a setscrew 62. An L-shaped bracket 64 is welded at one end to the upper surface of plate 52, and the upper horizontal leg of the bracket is pivotally connected by a pivot pin 66 to a tubular link 68. Link 68 slidably receives an extension 70 which is adjustably secured within the link by means of a setscrew 72. Extension 70 is pivotally connected at its free end by a pivot pin 74 to a horizontal arm 76 welded at one end to the handle 60.

An elongated tongue 78 is pivotally connected by means of a vertically extending pivot pin 80 to a pair of plates 82 which are clamped by nut and bolt assemblies against the upper and lower surfaces of the central portion of front leg 14. A generally Z-shaped bracket 84 is riveted to the front end of tongue 78 so as to provide a rectangular space 86 for receiving the drawbar 88 of a towing tractor 90 and the tongue is pivotally connected to the drawbar by a vertically extending pivot pin 133 passing through aligned apertures in the forward end of the tongue and bracket.

A pair of spaced parallel ears 92 are secured to the forward end of the tongue 78 and project laterally from the left side thereof. A similar pair of ears 94 are secured in spaced relationship to the central portion of the tongue 78 and extend laterally from the right side thereof. A short link 96 extends between the ears 94 and is pivotally connected thereto by a vertically extending pivot pin extending through aligned bores in the ears and short link. A long link 98 has one end extending between the ears 92 and is pivotally connected thereto by a pivot pin or rivet 100 which extends through aligned bores in the long link and ears 92.

A pair of flat plates 102 straddle the forward end of the bight portion 18 and are clampingly engaged therewith by nut and bolt assemblies 104. A sleeve 106 is welded to the upper surface of the upper plate 102 and has a bore extending horizontally therethrough which slidably receives a shaft 108 fixed to the upper end of a vertical channel shaped bumper 110. A setscrew 112 is threaded through the sleeve 106 so as to adjustably lock the shaft 108 and bumper 110 in proper position.

A link support plate 114 extends horizontally under the rear end of bight portion 18 and is secured thereto by an upper plate 116 and nut and bolt assemblies which extend vertically through aligned bores in the plates. The support plate 114 projects laterally outwardly beyond the side of the bight portion 18 and is provided with an upwardly extending flange 118.

A pair of horizontally spaced link connector plates 120 straddle a central portion of the bight portion 18 and are clampingly engaged and secured thereto by a plurality of nut and bolt assemblies which extend through aligned bores in the plates. The connector plates 120 extend laterally outwardly beyond the left side of the bight portion 18 and the outer ends thereof are provided with aligned vertical bores for receiving a pivot pin or rivet 122.

The rear end of the extension 30 is also provided with a pair of horizontal vertically spaced ears 124 having aligned apertures therein for removably receiving a pivot pin 126. The plates 32 and 34 on the extension member 22 extend laterally beyond opposite sides of the extension member and both ends of both plates are provided with vertical aligned bores for receiving removable pivot pins 125 and 127 vertically slidable therein.

Tongue 78 has an L-shaped link support bracket 128 welded to its right side directly behind the ears 94.

In using the drawbar 10 for towing a plurality of vehicles or farm implements such as grain drills 130 and 132, the drawbar is secured to the tractor 90 and the grain drills as illustrated in FIGURE 1. The tongue 78 is connected to the tractor 90 by extending drawbar 88 through slot 86 and pivotally connecting the tongue to the drawbar by a pivot pin 133. The free end of link 96 is inserted between plates 32 and 34 and connected thereto by extending a vertical pivot pin 125 within aligned bores in the plates and link. The long link 98 is pivoted counterclockwise about its pivot pin 122 and supported on the link support plate 114 parallel to the bight portion 18. The tongues of the grain drills 130 and 132 are pivotally connected to the free ends of the legs 14 and 16 by means of removable pivot pins 126 and 127 extending through plates 32 and 34 and the ears 124.

The angular position of frame 12 relative to the tractor 90 may be varied by adjusting extension member 22 relative to the arm 14 since this changes the distance between pivot pins 125 and 122. The lateral positioning of the grain drill 132 relative to the grain drill 130 may also be adjusted by adjustably sliding extension member 30 within the rear leg 16.

To arrange the grain drills 130 and 132 so that they will operate in side-by-side relationship as illustrated in FIGURE 2, it is only necessary to remove the pivot pin 125, lift up on the free end of link 98 and pivot it clockwise to the position shown in FIGURE 2, and then maneuver the tractor or frame 12 until the free end of the link 98 extends between ears 92. The forward end of the link 98 is then connected to the tongue 78 by inserting pin 100 through aligned bores in the ears 92 and said link 98. The setscrew 72 in the rear wheel assembly 48 is then loosened and the rear wheel is properly aligned with the forward wheels 42 and 42' by means of the manually operable handle 60. After wheel 58 is properly aligned, setscrew 72 is re-tightened. Proper spacing or overlapping relationship of the paths of travel of the grain drills may be adjusted by extending or retracting the extension members 30 and 22. Link 96 when not in use is supported on the support bracket 128.

When the grain drills are in tandem relationship as illustrated in FIGURE 1, the bumper 110 is properly adjusted so as to be in axial alignment with the stationary axle of the wheels for the grain drill 130 or in alignment with the rim of the inside wheel of the grain drill so as to prevent contact between the grain drill and frame 12.

When converting the invention from a field setting to a road setting wherein the grain drills are in tandem relationship, it is unnecessary to unhook the implements and it is further unnecessary to unhook the tractor. It is only necessary to couple or uncouple the links 96 and 98 and to adjust the rear wheel assembly 48. The adjustable feature of the effective lengths of the arms 14 and 16 permits implements of various sizes and width to be effectively used by the drawbar 10.

When using the drawbar 10, the operator can make a complete turn to the left and a complete turn to the right with both implements hooked to the drawbar. This can be done with the drawbar in either a field side-by-side setting or a road tandem setting. This may not seem important, but it is particularly important when the implements are used on hilly terrain and when the operator must make frequent complete turns with the tractor 90.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A drawbar for towing implements behind a towing vehicle comprising, a substantially U-shaped frame disposed horizontally when in operative position, said frame having a front leg and rear leg connected at their ends by a bight portion, ground engaging support wheels connected to said frame, coupling means on the free end of each leg for connection with one of the implements,
an elongated tongue pivotally connected at one end to a central portion of the front leg and having means at its other end adapted to be connected to the towing vehicle,
a first link shorter than said tongue,
a second link substantially longer than said first link,
connecting means to pivotally connect on a vertical axis said first link to a central portion of said tongue, and pivotally connect on a vertical axis one end of said second link to said bight portion, said connecting means including means for selectively connecting an end of said first link to the free end of said front leg and means to selectively connect the other end of said second link to a forward portion of said tongue
whereby said implements may be towed in either tandem relationship or in side-by-side relationship for a field setting.

2. A drawbar for towing implements behind a towing vehicle comprising,
a substantially U-shaped frame disposed horizontally when in operative position, said frame having a front leg and rear leg of different lengths connected at one of their ends at obtuse angles to a bight portion,
ground engaging support wheels connected to said frame,
coupling means on the free end of each leg for connection with one of the implements,
an elongated tongue pivotally connected at one end to a central portion of the front leg and having means at its other end adapted to be connected to the towing vehicle,
a first link shorter than said tongue,
a second link substantially longer than said first link,
connecting means for selectively connecting each of said links between said tongue and said frame on opposite sides of said tongue
whereby said implements may be towed in either tandem relationship or in side-by-side relationship for a field setting.

3. A drawbar for towing implements behind a towing vehicle comprising,
a substantially U-shaped frame disposed horizontally when in operative position, said frame having a front leg and rear leg connected at their ends by a bight portion,
ground engaging support wheels connected to said frame,
coupling means on the free end of each leg for connection with one of the implements,
an elongated tongue pivotally connected at one end to said front leg and having means at its other end for connection to said towing vehicle,
a first link shorter than said tongue,
a second link substantially longer than said first link,
connecting means to pivotally connect said first link to said tongue, and pivotally connect one end of said second link to said bight portion, said connecting means including means for selectively connecting an end of said first link to the free end of said front leg and means for selectively connecting the other end of said second link to a forward portion of said tongue,
whereby said implements may be towed in either tandem relationship or in side-by-side relationship for a field setting.

4. A drawbar as defined in claim 3 wherein the free ends of said front and rear legs are adjustable to selectively vary the lengths of said legs.

5. A drawbar as defined in claim 3 wherein the connection of one end of said second link to said bight portion is selectively adjustable to any point along said bight.

6. A drawbar as defined in claim 3 wherein the connection of one end of said tongue to said front leg is selectively adjustable to any point along said leg.

References Cited in the file of this patent
UNITED STATES PATENTS

| | | |
|---|---|---|
| 1,582,947 | Wagner et al. | May 4, 1926 |
| 2,971,774 | Bartel | Feb. 14, 1961 |
| 2,976,058 | Sandgren | Mar. 21, 1961 |